(12) United States Patent  
Satoh et al.

(10) Patent No.: US 8,625,158 B2  
(45) Date of Patent: Jan. 7, 2014

(54) APPARATUS, METHOD, AND COMPUTER PROGRAM PRODUCT FOR FORMING IMAGES

(75) Inventors: Tadashi Satoh, Tokyo (JP); Yusuke Kudo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 294 days.

(21) Appl. No.: 12/929,601

(22) Filed: Feb. 3, 2011

(65) Prior Publication Data

US 2011/0205564 A1    Aug. 25, 2011

(30) Foreign Application Priority Data

Feb. 25, 2010   (JP) ................... 2010-040841

(51) Int. Cl.  
*G06K 9/00* (2006.01)  
*G06K 9/36* (2006.01)  
*G06K 15/02* (2006.01)

(52) U.S. Cl.  
CPC ..................... *G06K 15/02* (2013.01)  
USPC ........................... 358/1.9; 382/166

(58) Field of Classification Search  
USPC ........... 382/166, 233; 358/500, 1.9, 501, 502, 358/503, 518, 523  
See application file for complete search history.

(56) References Cited

U.S. PATENT DOCUMENTS

| | | | |
|---|---|---|---|
| 5,710,577 A * | 1/1998 | Laumeyer | 345/548 |
| 7,911,649 B2 * | 3/2011 | Imine | 358/2.1 |
| 2009/0031235 A1 * | 1/2009 | Martin et al. | 715/765 |
| 2009/0060325 A1 * | 3/2009 | Shiraishi | 382/166 |
| 2010/0100505 A1 * | 4/2010 | Campbell et al. | 705/400 |
| 2011/0080597 A1 * | 4/2011 | Yamada et al. | 358/1.2 |
| 2011/0176157 A1 * | 7/2011 | Katayama | 358/1.9 |
| 2012/0194831 A1 * | 8/2012 | Randell | 358/1.9 |

FOREIGN PATENT DOCUMENTS

| | | |
|---|---|---|
| JP | 05-064022 A | 3/1993 |
| JP | 06-332638 | 12/1994 |
| JP | 2000-255123 | 9/2000 |
| JP | 2004-212696 A | 7/2004 |
| JP | 2004-216813 | 8/2004 |
| JP | 2007-310607 | 11/2007 |

OTHER PUBLICATIONS

Japanese Office Action dated Oct. 8, 2013 issued in corresponding Japanese Application No. 2010-040841.

* cited by examiner

*Primary Examiner* — Jerome Grant, II  
(74) *Attorney, Agent, or Firm* — Harness, Dickey & Pierce, P.L.C.

(57) ABSTRACT

A disclosed image forming apparatus for color printing includes a generator unit configured to generate dot sequential data as printing data based on received PDL color data, an image adjustment-conversion unit configured to carry out image adjustment processing and/or image conversion processing on the printing data generated by the generator unit based on a set printing condition, a rendering unit configured to render the printing data held in a page memory on which the image adjustment processing and/or the image conversion processing has been carried out by the image adjustment-conversion unit, and a printing unit configured to print the printing data rendered by the rendering unit.

8 Claims, 17 Drawing Sheets

FIG.5

| DATA FORMAT | PDL DATA TYPE | DECODE FUNCTION NAME |
|---|---|---|
| | DATA TYPE | |
| TIFF | TIFF COLOR DATA (DOT SEQUENTIAL) | decodeFunc011() |
| | TIFF COLOR DATA (FRAME SEQUENTIAL) | decodeFunc012() |
| | TIFF/JPEG COLOR DATA | decodeFunc013() |
| | TIFF/JPEG GRAYSCALE DATA | decodeFunc014() |
| | TIFF MONOCHROME DATA | decodeFunc015() |
| SunRaster | SunRaster FULL COLOR DATA | decodeFunc021() |
| | SunRaster MONOCHROME DATA | decodeFunc022() |
| XWD | XWD MONOCHROME DATA (normal) | decodeFunc031() |
| | XWD MONOCHROME DATA (bitswap) | decodeFunc032() |
| | XWD MONOCHROME DATA (byteswap) | decodeFunc033() |
| | XWD MONOCHROME DATA (bytebitswap) | decodeFunc034() |
| | XWD MONOCHROME DATA (shift) | decodeFunc035() |
| CALSRaster | CALSRaster MONOCHROME DATA (normal) | decodeFunc041() |
| ...... | ...... | ...... |

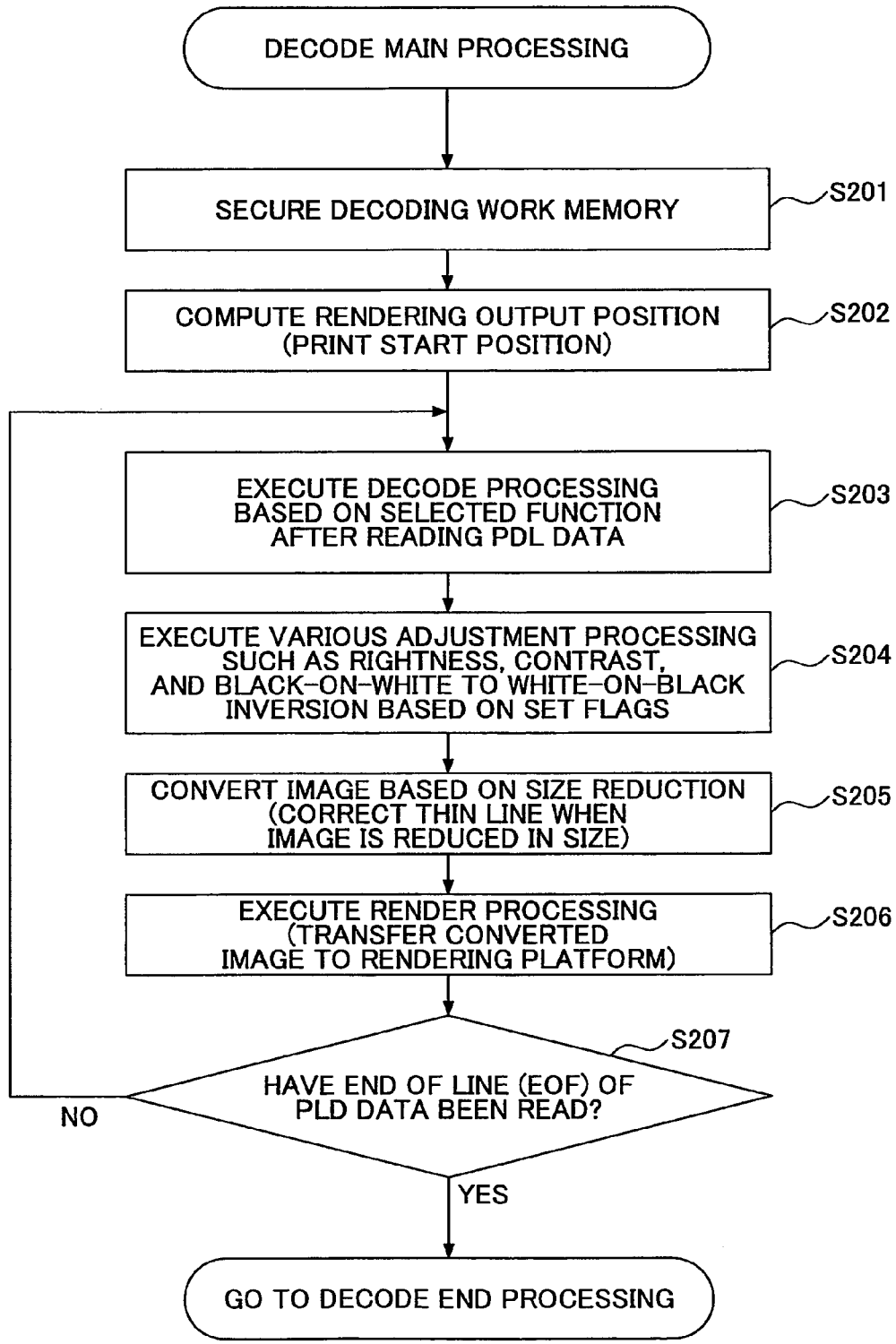

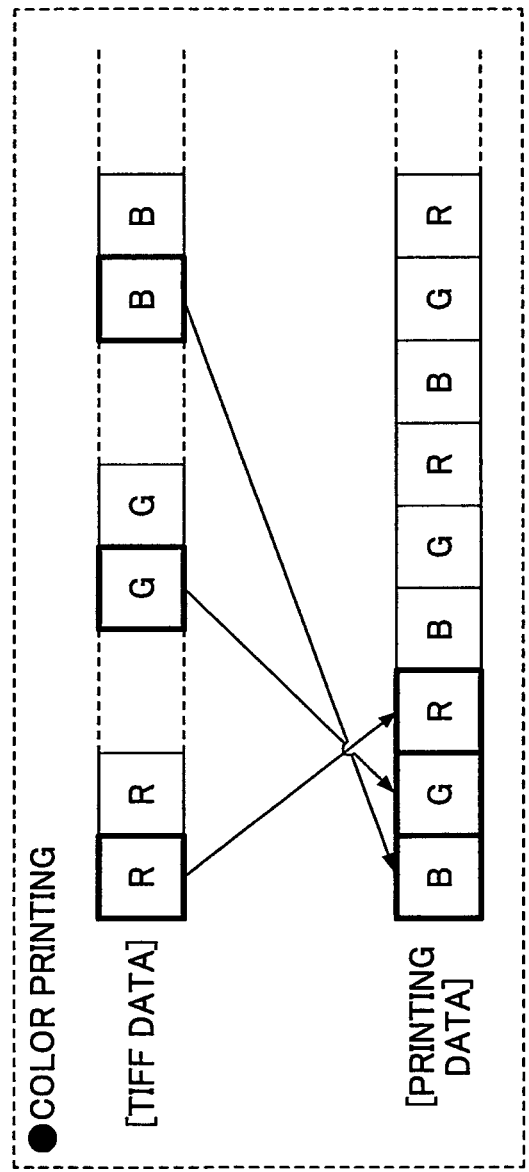

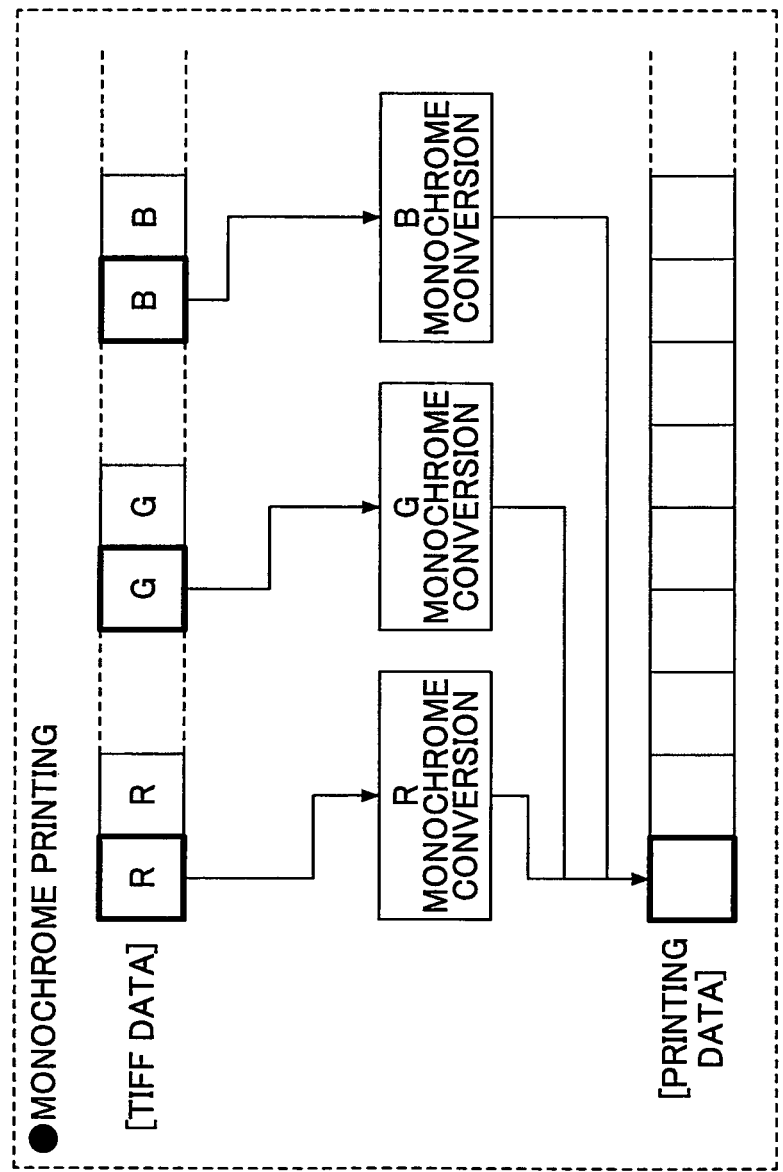

APPARATUS, METHOD, AND COMPUTER PROGRAM PRODUCT FOR FORMING IMAGES

BACKGROUND OF THE INVENTION

1. Field of the Invention

The invention generally relates to an apparatus, a method, and a computer program product for forming images, and specifically relates to a colorizing technology in Page Description Language (PDL).

2. Description of the Related Art

Japanese Patent Application Publication No. 5-64022 discloses a color image transmission system in which image data are transmitted based on an output system supported by a plotter, such as a frame sequential system or a dot sequential system, when a data transmitting device transmits image data to the plotter (i.e., a printer engine). There are two types of color image transmission systems used in an image forming apparatus, namely, a frame sequential system (or also called a "component interleave system") and a dot sequential system (block interleave system). In the frame sequential system (component interleave system), color components (i.e., "R, G, and B") constituting an image (a frame) are transmitted per component in the frame. That is, a unit having one-dimensionally arranged signals of each color component (R, G, or B) is transmitted per frame. In the dot sequential system (block interleave system), signals of color components (R, G, and B) are transmitted per pixel. That is, a unit having one-dimensionally arranged signals of color components (R, G, and B) is transmitted per pixel.

Further, in the image forming apparatus, various image adjustments may be carried out on image data transmitted to a plotter based on print condition settings in order to achieve a high quality printing result a user desires. For example, in printing tagged image file format data (TIFF data), "brightness", or "contrast" for the printing result may be adjusted. Moreover, image conversion such as enlargement or reduction in size of the image may also be adjusted.

However, there are the following drawbacks in color adjustments in the related art image forming apparatuses.

For example, there is an image forming apparatus that employs a dot sequential system for transmitting TIFF monochrome data to a plotter. In the dot sequential system, it is relatively easy to carry out image adjustments and image conversion on the image data or easy to handle the image data compared to the image adjustments and image conversion or the image handling in the frame sequential system and easier so that higher processing ability may be realized in the dot sequential system. However, if the TIFF color data are transmitted in a frame sequential manner in the above image forming apparatus having the dot sequential system, the image forming apparatus needs to have an extended function to carry out image adjustment-image conversion on the TIFF color data for adjusting colors of the image. That is, the image forming apparatus needs to have an image adjustment-image conversion function for colors (i.e., the extended function) in addition to an existing monochrome image adjustment-image conversion function.

If the image transmission system is not unified into in a color transmission system or a monochrome transmission system in the image forming apparatus, processing flows such as the image adjustment and image conversion or image rendering need to be further branched in each of the color and monochrome image transmission systems.

Unifying the image transmission system for color and monochrome data is cumbersome for developers and workload for such tasks on the developers even increases if the image forming apparatus has numerous models. Moreover, the extended function may result in increases in complication of maintenance and in development cost for manufacturers.

Thus, it is desirable that a monochrome image adjustment-image conversion function that carries out the dot sequential image data processing be made capable of carrying out the frame sequential image data processing on color image data in the image forming apparatus. That is, it is desirable that the monochrome image adjustment-conversion function be made compatible with color data transmitted in the frame sequential system to be provided as a shared function such that the monochrome image adjustment-conversion function is made compatible with color image frame sequential transmission, thereby being capable of carrying out monochrome and color image adjustment and conversion using the shared function.

SUMMARY OF THE INVENTION

It is a general object of at least one embodiment of the present invention to provide an apparatus, a method, and a computer program product capable of forming images utilizing a monochrome image adjustment-conversion function made compatible with color data that substantially eliminate one or more problems caused by the limitations and disadvantages of the related art.

In one embodiment, there is provided an image forming apparatus for color printing that includes a generator unit configured to generate dot sequential data as printing data based on received PDL color data; an image adjustment-conversion unit configured to carry out image adjustment processing and/or image conversion processing on the printing data generated by the generator unit based on a set printing condition; a rendering unit configured to render the printing data held in a page memory on which the image adjustment processing and/or the image conversion processing has been carried out by the image adjustment-conversion unit; and a printing unit configured to print the printing data rendered by the rendering unit.

In another embodiment, there is provided a method of forming an image in an image forming apparatus for color printing. The method includes generating dot sequential data as printing data based on received PDL color data; carrying out image adjustment processing and/or image conversion processing on the printing data generated in the generating step based on a set printing condition; rendering the printing data held in a page memory on which the image adjustment processing and/or the image conversion processing has been carried out in carrying out the image adjustment-conversion step; and printing the rendered printing data rendered in the rendering step.

In another embodiment, there is provided a computer program product loaded in an image forming apparatus for color printing. The computer program product includes a set of instructions, which, when executed by a processor, implement a method for forming an image. The method includes generating dot sequential data as printing data based on received PDL color data; carrying out image adjustment processing and/or image conversion processing on the printing data generated in the generating step based on a set printing condition; rendering the printing data held in a page memory on which the image adjustment processing and/or the image conversion processing has been carried out in carrying out the image adjustment-conversion step; and printing the rendered printing data rendered in the rendering step.

BRIEF DESCRIPTION OF THE DRAWINGS

Other objects and further features of embodiments will be apparent from the following detailed description when read in conjunction with the accompanying drawings, in which:

FIG. 5 is a table illustrating a PDL data type in association with a decode function name in the image forming apparatus according to the first embodiment;

FIGS. 6A, 6B, and 6C are flowcharts illustrating decode processing examples in the image forming apparatus according to the first embodiment;

FIGS. 13A and 13B are operation examples illustrating a conversion process where TIFF color data (in the frame sequential system) are converted into printing data (i.e., color data are converted into unified data in the dot sequential system) in the image forming apparatus according to the first embodiment.

DESCRIPTION OF THE PREFERRED EMBODIMENTS

In the following, preferred embodiments of the invention (hereinafter simply called an "embodiment") are described in detail with reference to the accompanying drawings.

First Embodiment

<Hardware Configuration>

Figure 1:
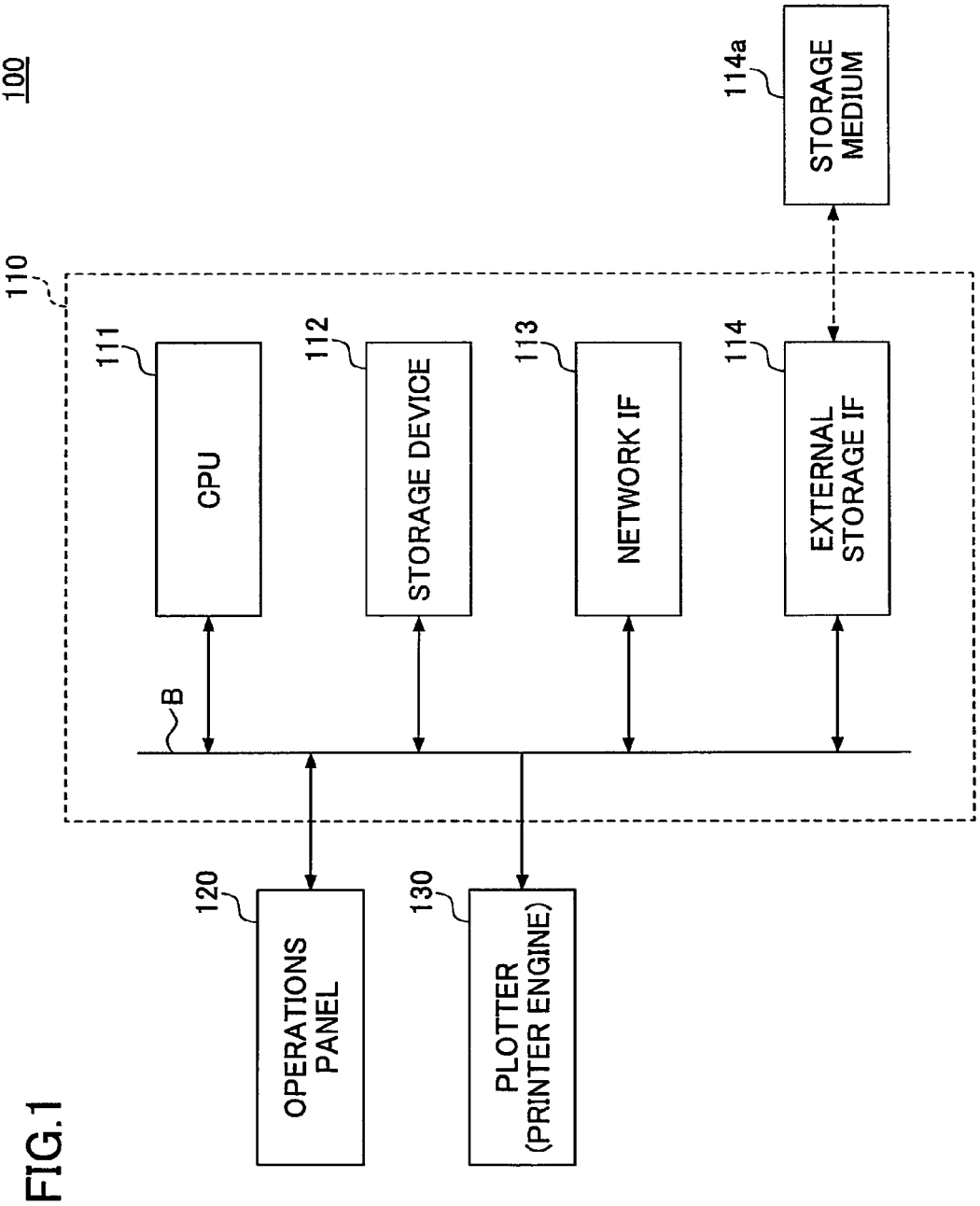
FIG. 1 is a diagram illustrating a hardware configuration example of an image forming apparatus according to a first embodiment.

FIG. 1 is a diagram illustrating a hardware configuration example of an image forming apparatus 100 according to an embodiment. As illustrated in FIG. 1, the image forming apparatus 100 mainly includes a controller 110, an operations panel 120, and a plotter (printer engine) 130 that are mutually connected via a bus B.

The operations panel 120 includes a display section and an input section via which a user receives various pieces of information such as apparatus information and inputs various user operations such as operational settings and operational instructions. The plotter 130 is configured to form an output image on a sheet based on transmitted printing data. The output image may be formed in an electrophotographic process or an ink-jet system.

The controller 110 includes a central processing unit (CPU) 111, a storage device 112, a network IF 113, and an external storage IF 114 that are mutually connected via the bus B.

The CPU 111 controls the entire image forming apparatus 100 by executing installed computer programs. The storage device 112 stores the above computer programs or various data such as image data. Examples of the storage device 112 includes a volatile random access memory (RAM), a non-volatile read only memory (ROM), and a hard disk drive (HDD) having a storage region with large capacity. The RAM serves a working area of the CPU 111, that is, a storage area in which the computer programs and data are temporarily held. The ROM and HDD are storage destinations of the computer programs and various data. With this configuration, the computer programs stored in the ROM are retrieved into the RAM to be executed in the image forming apparatus 100.

The network IF 113 serves as an interface to connect the image forming apparatus 100 to a predetermined data transmission path such as a network. The external storage IF 114 serves as an interface to connect the image forming apparatus 100 to a recording medium 114a that is an external storage device. Examples of such a recording medium 114a include a SD memory card and a universal serial bus (USB) memory. With this configuration, the image forming apparatus 100 is capable of retrieving the computer programs and data stored in the recording medium 114a via the external storage IF 114.

<Software Configuration>

Figure 2:
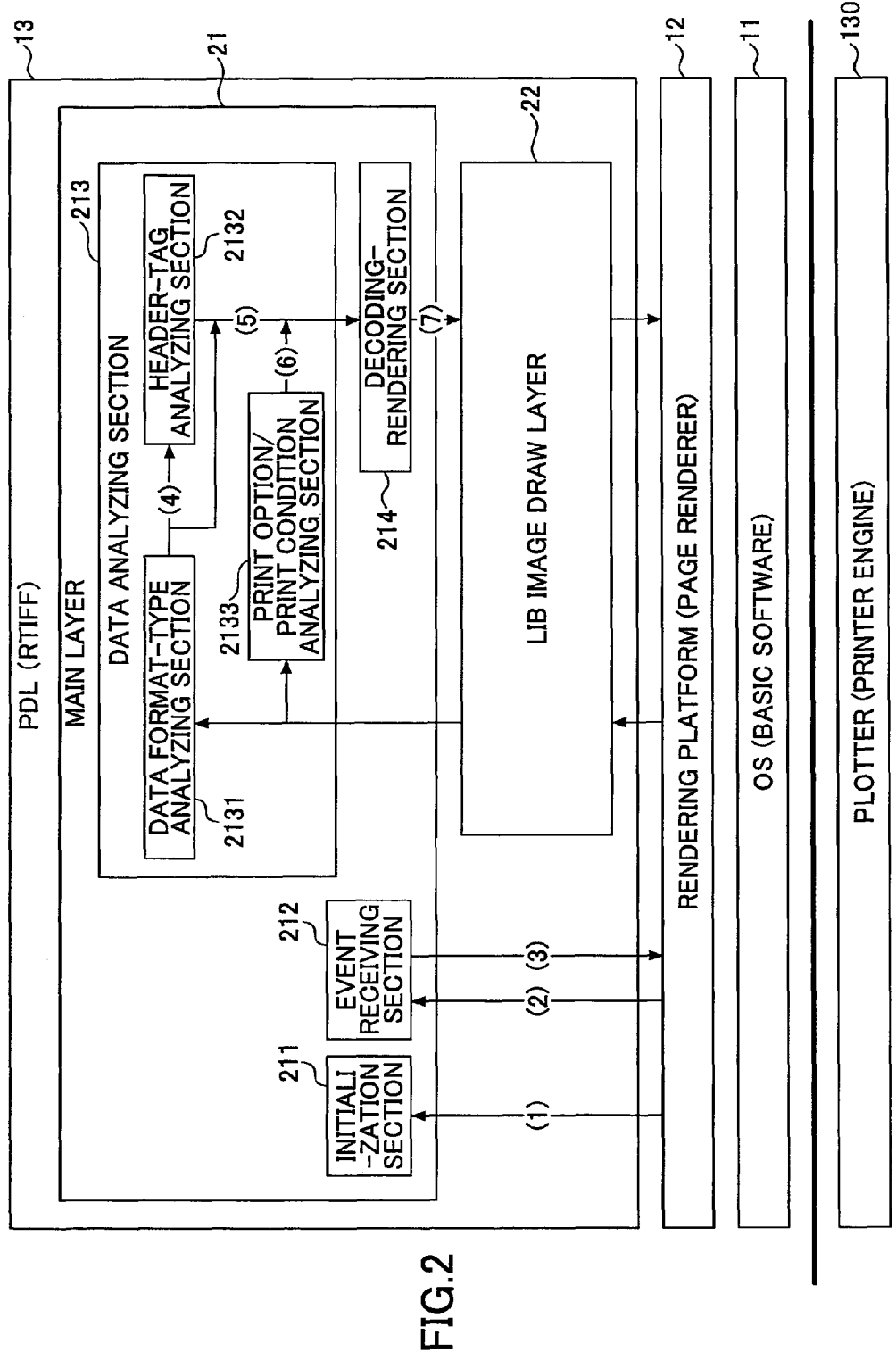
FIG. 2 is a diagram illustrating a software configuration example of the image forming apparatus according to the first embodiment.

FIG. 2 is a diagram illustrating a software configuration example of the image forming apparatus 100 according to the embodiment. As illustrated in FIG. 2, the image forming apparatus 100 includes an OS (basic software) 11, a rendering platform (page renderer) 12, and a PDL (RTIFF) 13. The software is executed by the CPU 111 residing in the controller 110.

The OS 11 is embedded basic software such as Linux (Trademark or Registered Trademark) to control the entire image forming apparatus.

The rendering platform 12 is software to provide a rendering function to the OS 11. For example, the rendering platform 12 carries out rendering using a paging memory based on a specified rendering instruction, to carry out various processing before printing on the OS 11 when rendering using the paging memory is finished. The rendering platform 12 includes various modules serving as functions of an apparatus model information acquisition library, a rendering library, a graphics engine, and a color matching module in addition to main body modules.

The PDL 13 is software configured to analyze PDL data to generate printable (processable by the plotter) data (printing data). The PDL 13 reads the PDL data, decodes the read PDL data, and generates the printing data. The PDL 13 then carries out image adjustment-conversion processing on the printing data based on print condition settings. Thereafter, the PDL 13 transfers the processed printing data to the rendering platform 12. Note that in this embodiment, an RTIFF configured to process TIFF data is provided as an example of the PDL 13.

The PDL 13 includes a main layer 21 and a lib image draw layer 22. In the main layer 21, the PDL data are analyzed and printing data are generated, and in the lib image draw layer 22, data are relayed between the rendering platform 12 and the main layer 21. Note that the data relay is carried out via a rendering IF provided from the rendering platform 12. Further, the data relayed include PDL data and printing data and the data relay is carried out in an image transmission system such as a dot sequential system or a frame sequential system. For example, in this embodiment, the rendering IF provided by the rendering platform 12 is for RGB color data, so the rendering IF is configured to have a specification to receive dot sequential data having non-compressed 8 bit data for each color (one pixel=24 bits).

The main layer 21 includes modules to serve functions including an initialization section 211, an event receiving section 212, a data analyzing section 213, and a decoding-rendering section 214.

The initialization section 211 includes a function to acquire unique apparatus model information (see (1) in FIG. 2)) from the rendering platform 12.

The event receiving section 212 includes a function to receive various control events such as startup/end/cancel events (see (3) in FIG. 2), or an open/close data buffer function (see (3) in FIG. 2) from the rendering platform 12.

The data analyzing section 213 includes a function to analyze PDL data received from the data buffer to acquire various pieces of information. More specifically, the data analyzing section 213 includes functions of a data format-type analyzing section 2131, a header-tag analyzing section 2132, and print option/print condition analyzing section 2133.

The data format-type analyzing section 2131 includes a function to analyze PDL data received from the data buffer to acquire data format information or PDL data type information (see (4) in FIG. 2). The acquired data type information includes TIFF, Sun (Trademark or Registered Trademark) Raster, XWD, and CALS Raster.

The header-tag analyzing section 2132 includes a function to analyze the header or tags in the data when the PDL data are TIFF data to acquire PDL data information (see (5) in FIG. 2). The acquired PDL data information includes a data size, a compression type, data width and height, and color unit and depth.

The print option/print condition analyzing section 2133 includes a function to analyze PDL data to acquire print option setting information added to the data or to acquire print condition setting information set in the image forming apparatus (see (6) in FIG. 2). The acquired setting information includes a brightness specification, a contrast specification, and an enlargement-reduction specification.

The decoding-rendering section 214 includes a function to generate, after receiving PDL data from the data buffer, printing data to render an image based on the generated printing data (see (7) in FIG. 2). The decoding-rendering section 214 is configured to carry out decode processing based on the compression type of the acquired PDL data information. The decoding-rendering section 214 is configured to carry out the image adjustment-conversion processing on the decoded data based on the acquired print option/print condition setting information. Thereafter, the decoding-rendering section 214 transfers the processed printing data to the rendering platform 12 via the lib image draw layer 22. The transferred printing data include decoded RAW data. Thus, a rendering instruction is sent to the rendering platform 12 (rendering is to be performed).

Figure 3:
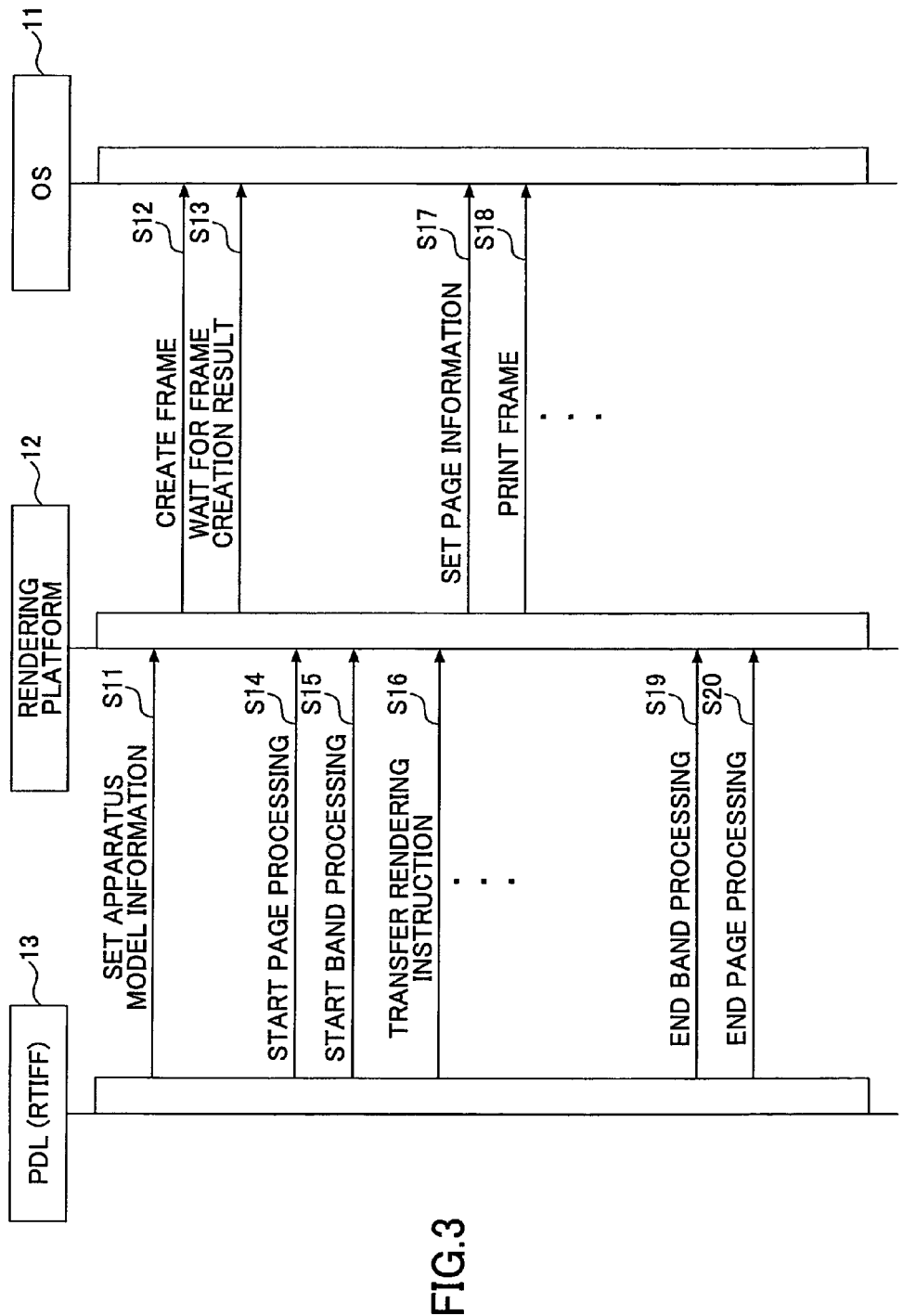
FIG. 3 is a sequence diagram illustrating a processing example in forming an image in the image forming apparatus according to the first embodiment.

More specifically, image forming processing illustrated in FIG. 3 is carried out. FIG. 3 is a sequence diagram illustrating a processing example in forming an image in the image forming apparatus according to the embodiment. As illustrated in FIG. 3, the PDL 13 initially sets apparatus model information in the rendering platform 12 (step S11).

When the apparatus model information is set in the rendering platform 12, the rendering platform 12 requests the OS 11 to create a rendering frame (step S12). As a result, the OS 11 secures a work memory used for rendering, that is, to create the rendering frame in the memory.

The rendering platform 12 waits for the rendering frame creation result and verifies whether the rendering frame has been created (memory has been secured) (step S13).

Subsequently, the PDL 13 starts carrying out band processing on each page for the rendering platform 12 (steps S14 and S15). Subsequently, the PDL 13 transfers printing data (transfers rendering instruction) per band unit to the rendering platform 12 (step S16).

When the transfer of the printing data is started, the rendering platform 12 sends page information to the OS 11 (step S17), and requests the OS 11 to carry out frame printing (step S18). As a result, the OS 11 controls the plotter 130 based on the page information and starts printing image data written in the rendering frame.

The PDL 13 repeatedly carries out the processing of step S16 and ends, when the printing data per page unit has been transferred, the band processing for each page in the rendering platform 12 (steps S18 and S19).

Note that FIG. 3 illustrates an example of the image forming processing for one page. Thus, if plural pages are subject to image forming processing, the process illustrated in FIG. 3 is repeated for the plural pages.

As described above, the image forming apparatus 100 having the above hardware and software configurations may provide image forming services (image forming functions).

<Image Forming Function>

An image forming function of the image forming apparatus 100 according to the embodiment is described. In the image forming function according to the embodiment, the following processing is carried out in the decoding-rendering section 214 of the PDL 13.

The decoding-rendering section 214 decodes the PDL data retrieved from the data buffer to generate the printing data. Subsequently, the decoding-rendering section 214 carries out image adjustment-conversion processing on the printing data based on print condition settings. The decoding-rendering section 214 then transfers the processed (image adjusted and converted) printing data to the rendering platform 12. In a process prior to the image adjustment-conversion processing, the decoding-rendering section 214 converts various PDL data into unified data in the dot sequential system and generates the dot sequentially unified data as the printing data.

In the image forming apparatus 100, it is desirable that a monochrome image adjustment-conversion function carrying out dot sequential monochrome data processing be made compatible with color data in the frame sequential system such that the monochrome image adjustment-conversion function is used as a shared function to serve a monochrome/color image adjustment-conversion function.

Accordingly, in the image forming function in the embodiment, since various PDL data are converted into unified data in the dot sequential system (hereinafter also called "dot sequentially unified data") as the printing data, the monochrome image adjustment-conversion function may be used as a shared monochrome/color image adjustment-conversion function.

Thus, in the image forming apparatus according to the embodiment, the monochrome image adjustment-conversion function is also used as a shared monochrome/color image adjustment-conversion function for color data processing in the frame sequential system to form images, thereby simplifying color image adjustment-conversion processing.

Figure 4:
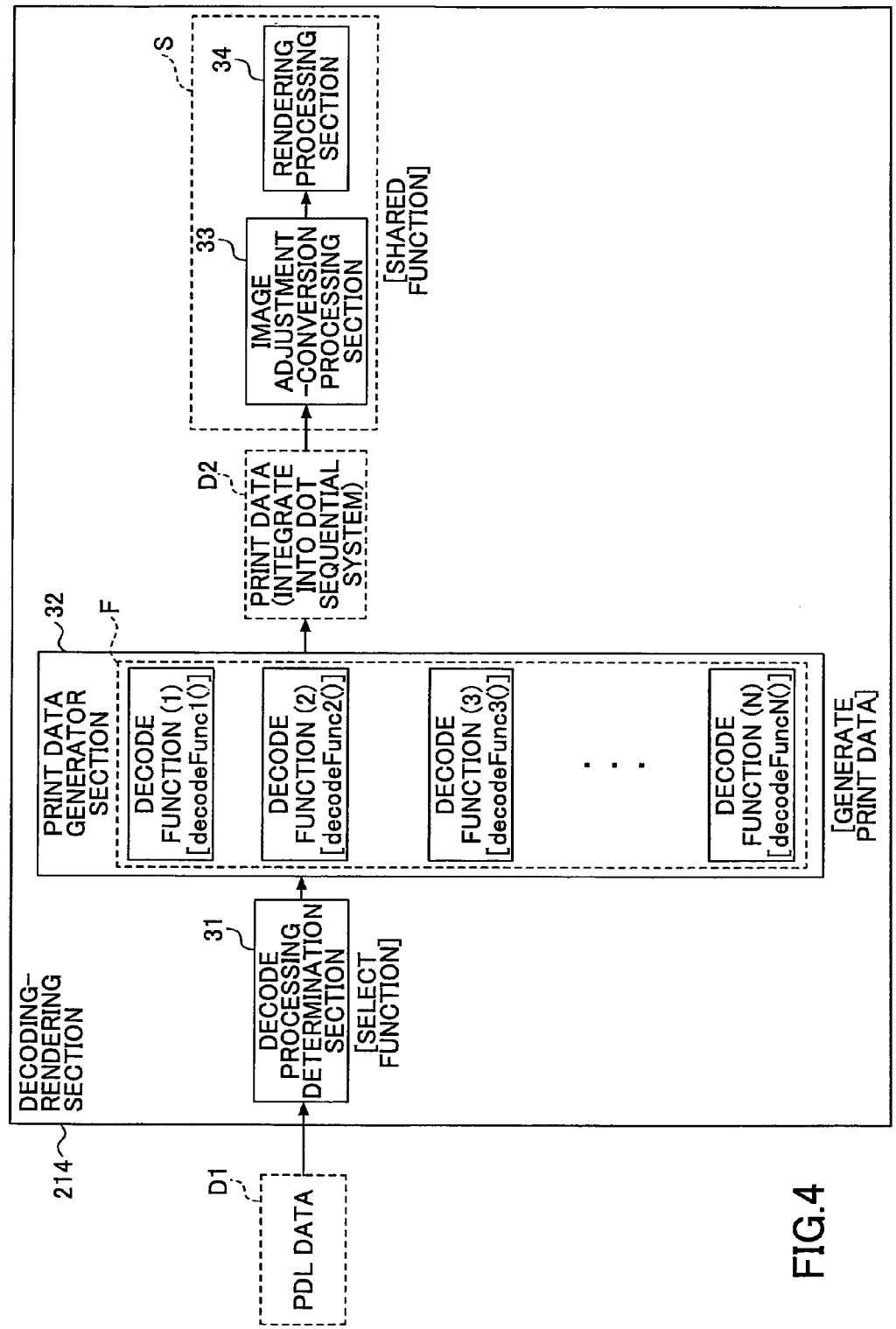
FIG. 4 is a diagram illustrating a functional configuration example of a decoding-rendering section in the image forming apparatus according to the first embodiment.

Next, a functional configuration and operations of the decoding-rendering section 214 are described below. FIG. 4 is a diagram illustrating a functional configuration example of the decoding-rendering section 214 according to the embodiment.

As illustrated in FIG. 4, the decoding-rendering section 214 includes a decode processing determination section 31, a print data generator section 32, an image adjustment-conversion processing section 33, and a rendering processing section 34.

The decode processing determination section 31 serves as a function to determine decode processing to be executed on PDL data D1 to generate printing data.

The print data generator section 32 serves as a function to generate dot sequential printing data D2 by carrying out the decode processing determined by the decode processing determination section 31 on the PDL data D1. The print data generator section 32 includes plural (N) decode functions (decodeFuncN) F to generate, after the PDL data D1 are decoded, dot sequential printing data D2 corresponding to the PDL D1 that are supported (printable) in the image forming function.

FIG. 5 is a table illustrating a PDL data type in association with a decode function name in the image forming apparatus according to the embodiment. As illustrated in FIG. 5, The PDL data D1 are classified based on a combination of a data format and a data type and a decode function F for generating the corresponding printing data D2 from the classified PDL D1 associated with the combination of the data format and data type.

Note that the data format indicates a data format that the PDL 13 may be processed for, examples of which include TIFF, Sun Raster, XWD, and CALS Raster formats. Note also that the data type indicates features of data such as color/monochrome, and data sequences, examples of which include color data, monochrome data, grayscale data, dot sequential data, and frame sequential data.

The association between the PDL data type (data format information and data type information) and the decode function F (decode function name) is determined in advance based on PDL data D1 to be supported by the image forming function.

Referring back to FIG. 4, the decode processing determination section 31 selects an appropriate decode function F from plural (N) decode functions F based on the PDL data type information. Note that the PDL data type information is obtained as a result of analysis carried out in the data format-type analyzing section 2131 in the software configuration.

The decode processing determination section 31 selects the appropriate decode function F corresponding to the received PDL data D1 based on the association between the PDL data type and the decode function name in the table in FIG. 5 as follows.

For example, on receiving the PDL data D1 having "TIFF color data (frame sequential)", the decode processing determination section 31 selects a decode function F having a function name "decodeFunc011( )" (see FIG. 5). Further, on receiving the PDL data D1 having "Sun Raster full color data", the decode processing determination section 31 selects a decode function F having a function name "decodeFunc021( )".

That is, the decode processing determination section 31 selects an appropriate decode functions F from N decode functions residing in the print data generator section 32 based on the data type of PDL data D1. Accordingly, the image forming function is capable of converting the various types of PDL data D1 into dot sequentially unified data to be generated as dot sequentially unified printing data D2. Further, since the image forming function generates the dot sequentially unified printing data D2 based on the various types of the PDL data D1 in the processing prior to the image adjustment-conversion processing, the image adjustment-conversion processing and the rendering processing may be carried out on various types of the PDL date D1 in a shared function (see a shared function "S" in FIG. 4).

For example, in the image forming function, even if the received PDL data D1 are "TIFF color data in the frame sequential system", the received TIFF color data in the frame sequential system (i.e., received PDL data D1) are converted into data in the dot sequential system to be generated as dot sequential printing data D2. Accordingly, the monochrome image adjustment-conversion function capable of carrying out processing on dot sequential data (data in the dot sequential system) may be used for processing the TIFF color data in the frame sequential system. That is, the monochrome image adjustment-conversion function may be used as a shared function of the color/monochrome image adjustment-conversion function.

In addition, in the image adjustment-conversion processing, data in the dot sequential system may be easier to manage and maintain intact performance to convert a color model RGB to a color model CMYK. In the RGB color data in the frame sequential system, signals corresponding to color components R, G, and B are one-dimensionally arranged by the color component in one image face. That is, the RGB color data in the frame sequential system are composed of three units of image data corresponding to the color components R, G, and B. By contrast, in the RGB color data in the dot sequential system, signals corresponding to color components R, G, and B are one-dimensionally arranged in one pixel. That is, the RGB color data in the dot sequential system are composed of one unit of image data containing the color components R, G, and B. As can be understood from the difference in the arrangement of the color signals, color signal values (R value, G value, and B value) of one pixel are discontinuously acquired from one image data element in the frame sequential system, whereas the RGB values are continuously acquired from the image data in the dot sequential system. Thus, using data in the dot sequential system it may be easier to carry out the image adjustment-conversion processing than using those in the frame sequential system. Thus, it is effective to generate the dot sequentially unified printing data D2 in the processing prior to the image adjustment-conversion processing in order to acquire processing performance.

The image adjustment-conversion processing section 33 in the shared function S (see FIG. 4) has a function to carryout various image adjustment-conversion processing on the dot sequential printing data D2 based on the print option setting and/or the print condition setting. Note that the print option setting and/or the print condition setting are information items obtained as a result of analysis carried out in the data format-type analyzing section 2131 in the software configuration. For example, the print conditions in this embodiment include "brightness", "contrast", "inverse pixel", and "size reduction".

In addition, the rendering processing section 34 in the shared function S (see FIG. 4) has a function to transfer the image adjustment-conversion processed image data to the rendering platform 12. The rendering processing section 34 retrieves the rendering IF provided by the rendering platform 12 via the lib image draw layer 22 and transfers the image data per predetermined unit (i.e., band unit).

As described above, the image forming function according to the embodiment may be implemented by cooperation among the above-described functions.

Next, specific operations (cooperative operations among the functions) of the decoding-rendering section 214 according to the embodiment are described with reference to a flowchart illustrating the processing.

The image forming function is implemented by executing computer programs (software components to implement the image forming function) installed in the image forming apparatus 100. More specifically, the CPU 111 retrieves the computer programs from a storage location such as a ROM and loads the retrieved computer programs into the work memory such as a RAM, then executes the loaded computer programs to carry out the processing described below.

Hereinafter, main processing (i.e., decode processing) of the decoding-rendering section 241 is described first followed by descriptions of color mode setting processing and decode function determination processing carried out in the main processing.

<Decode Processing>

Figure 6A:
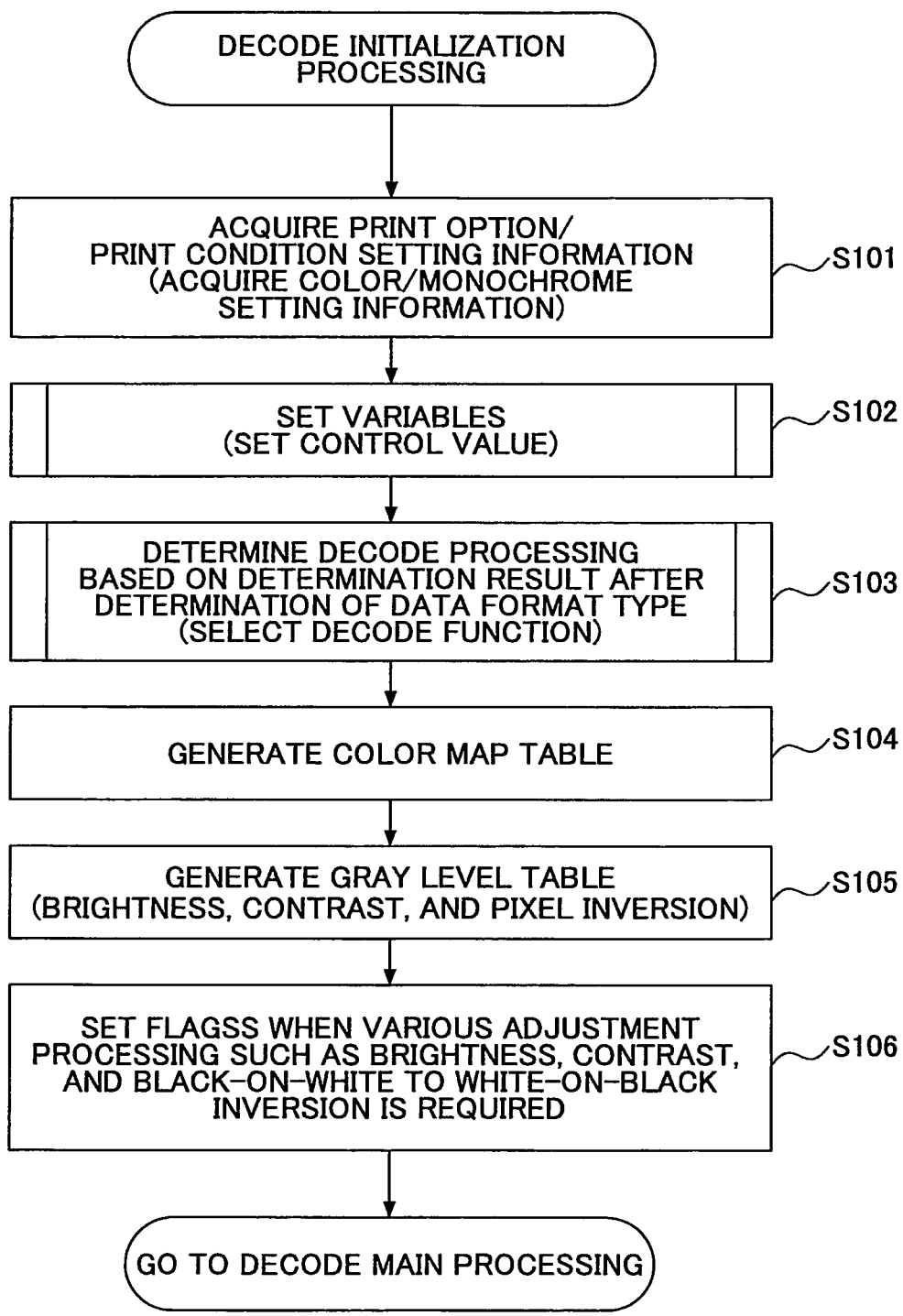
Figure 6C:
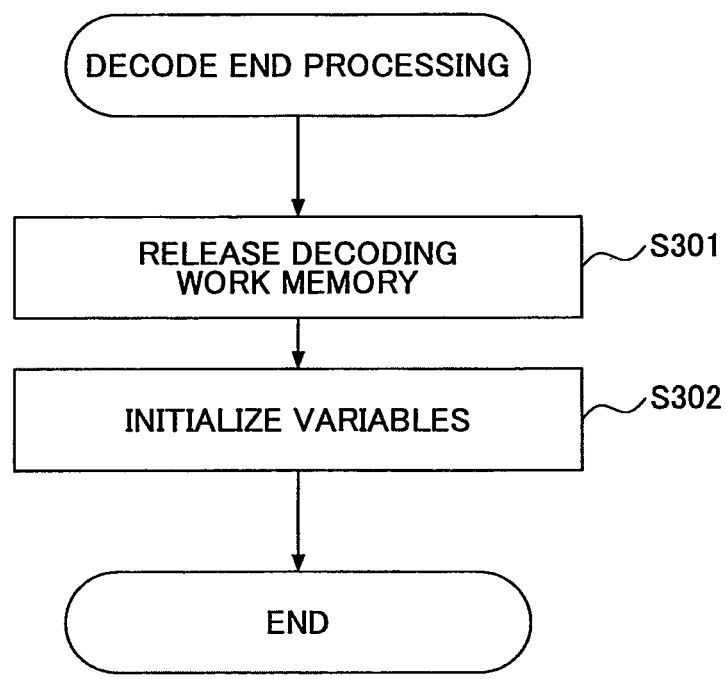

FIGS. 6A, 6B, and 6C are flowcharts illustrating decode processing examples according to the embodiment. As illustrated in FIGS. 6A, 6B, and 6C, the decode processing includes (A) decode initialization processing, (B) decode main processing, and (C) decode end processing.

(A) Decode Initialization Processing

The decoding-rendering section 214 acquires print option/ print condition setting information based on an analysis result obtained by the data analyzing section 213 (Step S101). For example, color/monochrome setting information may be acquired as the print option/print condition setting information.

Subsequently, the decoding-rendering section 214 sets variables based on the acquired information (step S102). In the variables, values specified for the print option/print condition are set as control values for controlling the following processing.

Subsequently, the decoding-rendering section 214 determines, after the decode processing determination section 31 determines a data format and a data type of the received PDL data D1, decode processing for generating printing data (step S103). In this step, the decode processing determination section 31 determines the data format of the PDL data D1 based on the PDL data type information acquired based on the analysis result obtained by the data analyzing section 213, and selects a decode function F corresponding to the data format of the PDL data D1.

Subsequently, the decoding-rendering section 214 generates a color map table for color conversion and a gray level table for image adjustments such as "brightness", "contrast", and "pixel inversion" (steps S104 and S105).

Subsequently, the decoding-rendering section 214 sets control flags indicating whether the image adjustments are required based on the print option/print condition setting (step S106). For example, if the image adjustments such as "brightness", "contrast", and "pixel inversion" are set as the print option/print condition, the control flags for these image adjustments are set.

The decoding-rendering section 214 ends the above decode initialization processing and subsequently carries out the decode main processing.

(B) Decode Main Processing

The decoding-rendering section 214 secures a decoding work memory (step S201). Subsequently, the decoding-rendering section 214 computes a rendering output position (print start position) based on the PDL data information acquired based on the analysis result obtained by the data analyzing section 213 (Step 202). For example, the rendering output position may be computed based on the data width and height of the PDL data information.

Subsequently, the decoding-rendering section 214 executes, after the print data generator section 32 reads the received PDL data D1, decode processing on the data read by the print data generator section 32 utilizing the decode function F selected in step S103 (step S203). As a result, the print data generator section 32 generates dot sequential printing data D2 based on the PDL data D1.

Subsequently, the decoding-rendering section 214 carries out the corresponding image adjustments on the printing data D2 based on the control flags set by the image adjustment-conversion processing section 33 in step S106 (step S204).

Subsequently, the decoding-rendering section 214 carries out image conversion based on the size reduction set by the image adjustment-conversion processing section 33 (step S205). In this step, the image adjustment-conversion processing section 33 carries out fine line correction when the image is reduced in size.

Subsequently, the decoding-rendering section 214 causes the rendering processing section 34 to carry out image rendering processing based on the image adjustment-conversion processed data (step S206). In this step, the rendering processing section 34 transfers the image adjustment-conversion processed data to the rendering platform 12.

The decoding-rendering section 214 determines whether the PDL data D1 have completely been read (i.e., whether EOF (End Of File) of the PDL data D1 has been read) from the data buffer (step S207), and repeats the steps S203 to S206 ("No" in step S207) until the EOF of the PDL data D1 has been read ("Yes" in step S207).

The decoding-rendering section 214 ends the above decode main processing and subsequently carries out the decode end processing.

(C) Decode End Processing

The decoding-rendering section 214 releases the decoding work memory secured in step S201 (step S301), and initializes the set variables (step S302). Initializing the variables indicates setting the variables back to default values.

<Color Mode Setting Processing>

Figure 7:
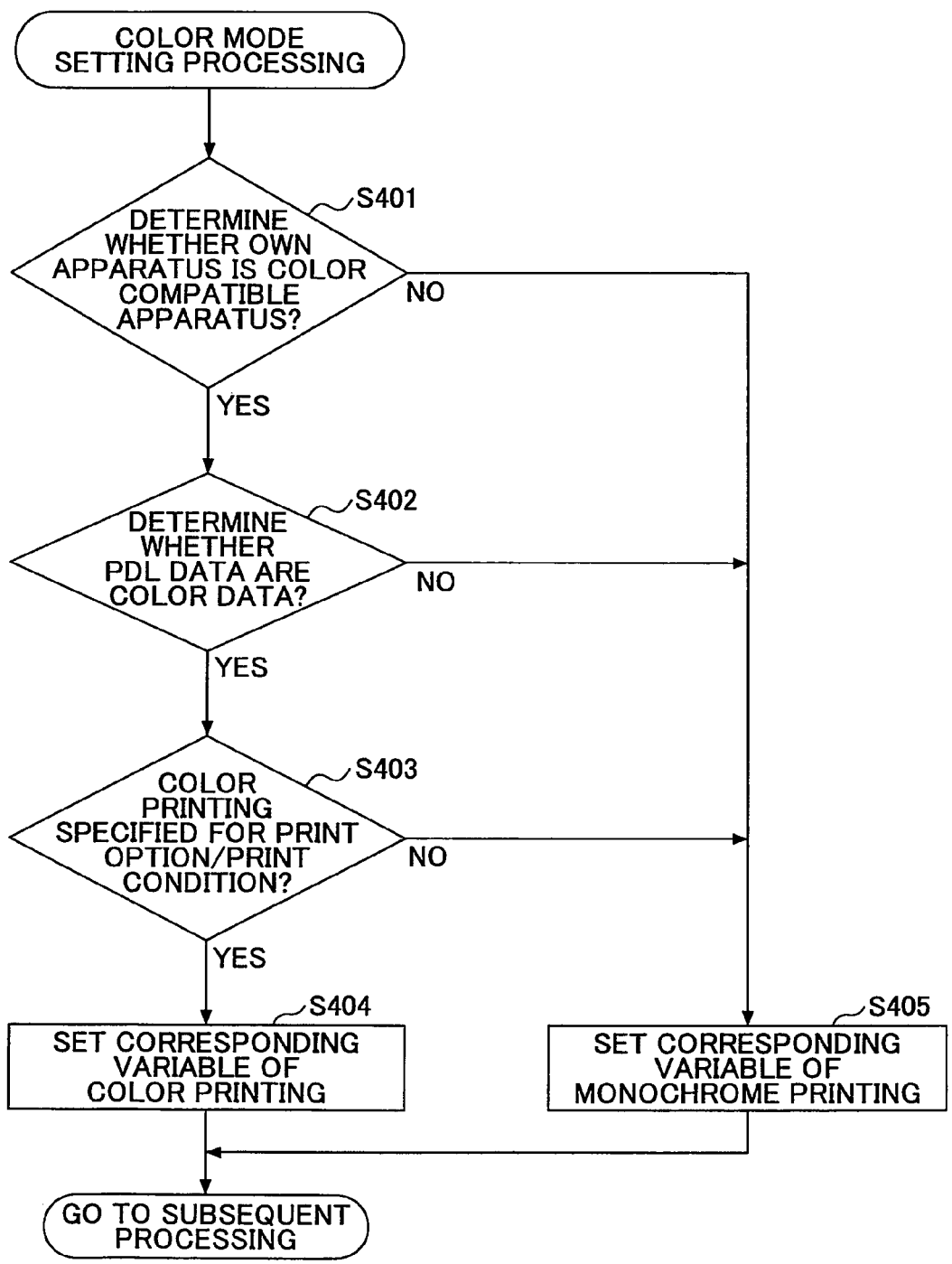
FIG. 7 is a flowchart illustrating a color mode setting processing example in the image forming apparatus according to the first embodiment.

FIG. 7 is a flowchart illustrating a color mode setting processing example according to the embodiment. FIG. 7 depicts detailed processing for color mode setting variables carried out in step S102.

As illustrated in FIG. 7, the decoding-rendering section 214 determines whether the image forming apparatus 100 incorporating the decoding-rendering section 214 (hereinafter also called an "own apparatus") is a color compatible apparatus (step S401). Whether the own image forming apparatus is color compatible is determined based on whether the apparatus information obtained by the initialization section 211 contains color support information.

If the decoding-rendering section 214 determines that the own apparatus is a color compatible apparatus ("Yes" in step S401), the decoding-rendering section 214 subsequently determines whether the received PDL data D1 are color data (step S402). Whether the received PDL data D1 are color data is determined based on color information in the PDL data D1 obtained by the data analyzing section 123.

If the decoding-rendering section 214 determines that the received PDL data D1 are color data ("Yes" in step S402), the decoding-rendering section 214 subsequently determines whether "color printing" is selected for the print option/print condition setting (step S403).

If the decoding-rendering section 214 determines that the "color printing" is specified for the print option/print condition setting ("Yes" in step S403), the decoding-rendering section 214 sets a corresponding variable of the color printing as the print option/print condition setting (step S404).

On the other hand, if the decoding-rendering section 214 determines that the own apparatus is not a color compatible apparatus ("No" in step S401), if the decoding-rendering section 214 determines that the received PDL data D1 are not color data ("No" in step S402), or if the decoding-rendering section 214 determines that the "color printing" is not specified for the print option/print condition setting ("No" in step S403), the decoding-rendering section 214 sets a corresponding variable of the monochrome printing as the print option/print condition setting (step S405).

The variable for color/monochrome printing set in the above manner is used to control decode function processing. Specific descriptions of the decode function processing are described in FIGS. 10 and 12.

<Decode Function Determination Processing>

Figure 8:
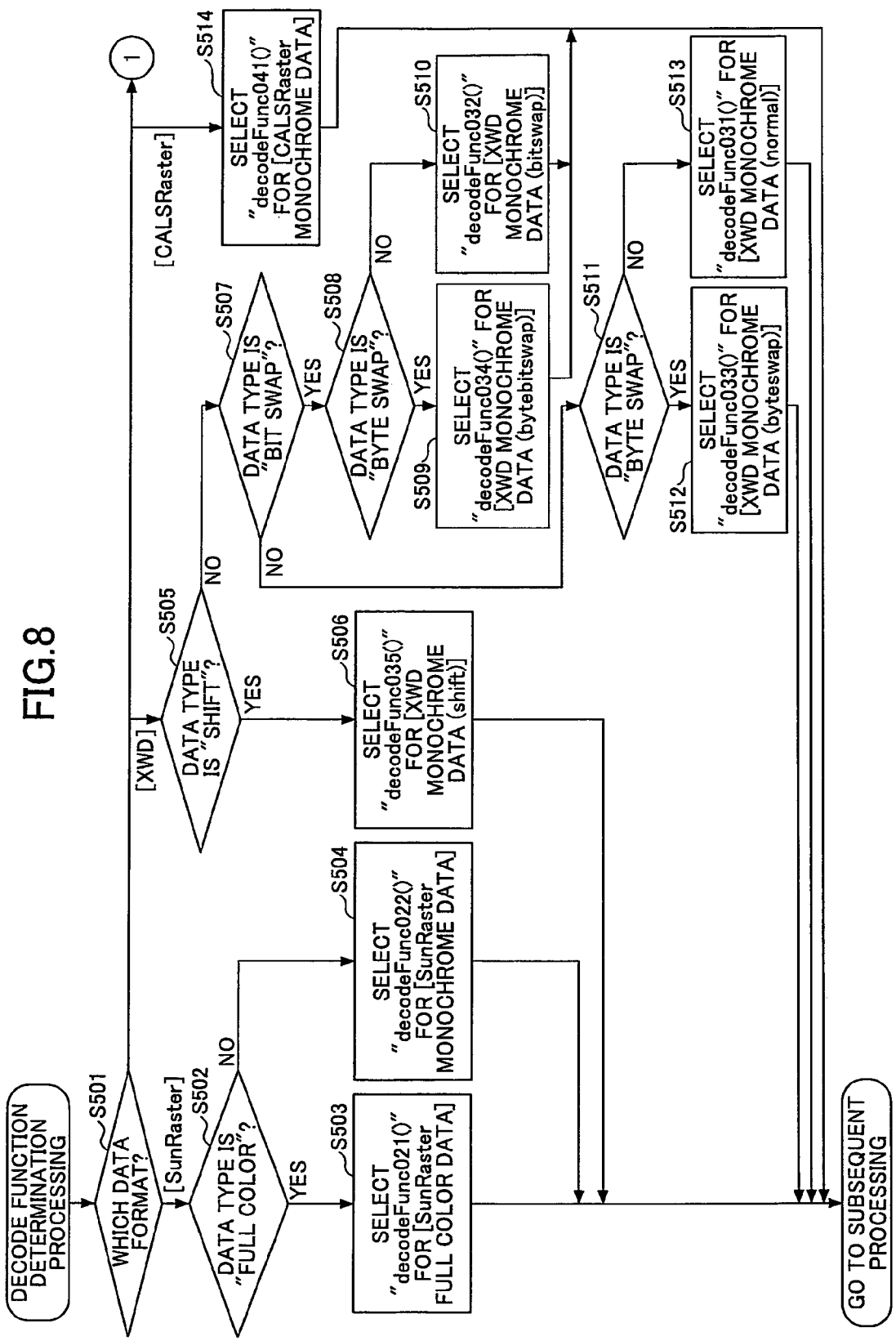
FIG. 8 is a flowchart illustrating a decode function determination processing example (part 1) in the image forming apparatus according to the first embodiment.
Figure 9:
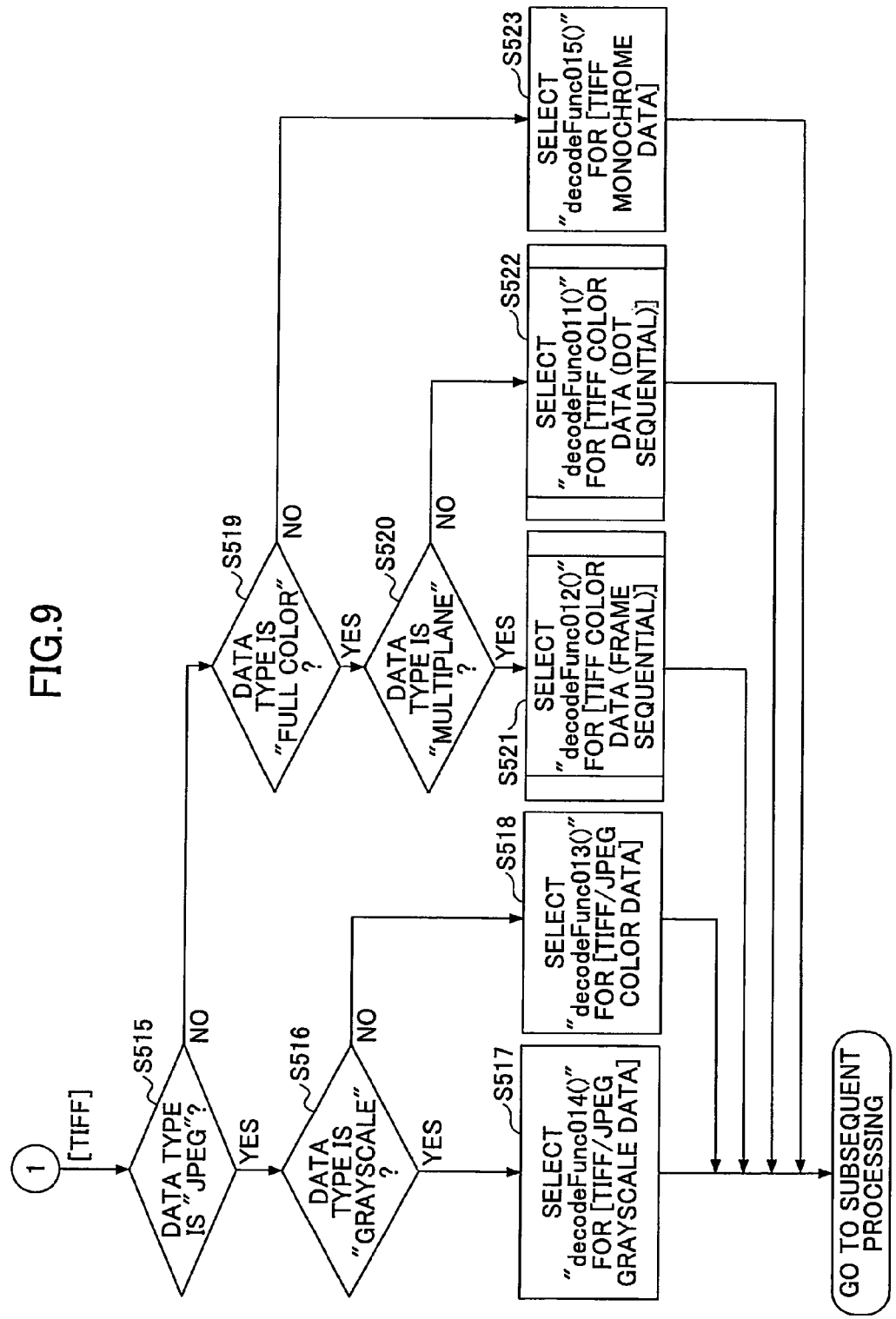
FIG. 9 is a flowchart illustrating a decode function determination processing example (part 2) in the image forming apparatus according to the first embodiment.

FIGS. 8 and 9 are flowcharts illustrating decode function determination processing examples according to the embodiment. FIGS. 8 and 9 depict detailed decode function determination processing carried out in step S103. The decode function determination processing is carried out in the decode processing determination section 31. Note that in the following description, an example of the decoding processing carried out based on the table illustrated in FIG. 5 is described.

As illustrated in FIG. 8, the decode processing determination section 31 controls determination of the decode processing based on the data format and data type of the PDL D1 of the PDL data type information (step S501). Details are described as follows.

If the data format of the PDL data D1 is "SunRaster" (step S501: [SunRaster]), the decode processing determination section 31 determines whether the data type is "full color" (step S502).

If the data type is "full color" ("Yes" in step S502), the decode processing determination section 31 selects a "decodeFunc021( )" for the data type "SunRaster full color data" as a decode function F for generating printing data (step S503) (see also FIG. 5). If, on the other hand, the data type is not "full color" ("No" in step S502), the decode processing determination section 31 selects a "decodeFunc022( )" for the data type "SunRaster monochrome data" as a decode function F for generating printing data (step S504) (see also FIG. 5).

Further, if the data format of the PDL data D1 is "XWD" (step S501: [XWD]), the decode processing determination section 31 determines whether the data type is "shift" (step S505).

If the data type is "shift" ("Yes" in step S505), the decode processing determination section 31 selects a "decodeFunc035( )" for the data type "XWD monochrome data (shift)" as a decode function F for generating printing data (step S506) (see also FIG. 5). If, on the other hand, the data type is not "shift" ("No" in step S505), the decode processing determination section 31 determines whether the data type is "bitswap" (step S507).

If the data type is not "bitswap" ("Yes" in step S507), the decode processing determination section 31 determines whether the data type is "byteswap" (step S508).

If the data type is "byteswap" ("Yes" in step S508), the decode processing determination section 31 selects a "decodeFunc034( )" for the data type "XWD monochrome data (bytebitswap)" as a decode function F for generating printing data (step S509) (see also FIG. 5). If, on the other hand, the data type is not "byteswap" ("No" in step S508), the decode processing determination section 31 selects a "decodeFunc032( )" for the data type "XWD monochrome data (bitswap)" as a decode function F for generating printing data (step S510) (see also FIG. 5).

Further, if the data type is not "bitswap" ("No" in step S507), the decode processing determination section 31 determines whether the data type is "byteswap" (step S511).

If the data type is "byteswap" ("Yes" in step S511), the decode processing determination section 31 selects a "decodeFunc033( )" for the data type "XWD monochrome data (byteswap)" as a decode function F for generating printing data (step S512) (see also FIG. 5). If, on the other hand, the data type is not "byteswap" ("No" in step S511), the decode processing determination section 31 selects a "decodeFunc031( )" for the data type "XWD monochrome data (normal)" as a decode function F for generating printing data (step S513) (see also FIG. 5).

If the data format of the PDL data D1 is "CALSRaster" (step S501: [CALSRaster]), the decode processing determination section 31 selects a "decodeFunc041" for the data type "CALSRaster monochrome data" as a decode function F for generating printing data (step S514) (see also FIG. 5).

Next, further description follows with reference to FIG. 9. If the data format of the PDL data D1 is "TIFF" (step S501: [TIFF]), the decode processing determination section 31 determines whether the data type is "JPEG" (step S515).

If the data type is "JPEG" ("Yes" in step S515), the decode processing determination section 31 determines whether the data type is "grayscale" (step S516).

If the data type is "grayscale" ("Yes" in step S516), the decode processing determination section 31 selects a "decodeFunc014( )" for the data type "TIFF/JPEG grayscale data" as a decode function F for generating printing data (step S517) (see also FIG. 5). If, on the other hand, the data type is not "grayscale" ("No" in step S516), the decode processing determination section 31 selects a "decodeFunc013( )" for the data type "TIFF/JPEG color data" as a decode function F for generating printing data (step S518) (see also FIG. 5).

Further, if the data type is not "JPEG" ("No" in step S515), the decode processing determination section 31 determines whether the data type is "full color" (step S519).

If the data type is "full color" ("Yes" in step S519), the decode processing determination section 31 determines whether the data type is "multiplane" (step S520).

If the data type is "multiplane" ("Yes" in step S520), the decode processing determination section 31 selects a "decodeFunc012( )" for the data type "TIFF color data (Frame sequential)" as a decode function F for generating printing data (step S521) (see also FIG. 5). If, on the other hand, the data type is not "multiplane" ("No" in step S520), the decode processing determination section 31 selects a "decodeFunc011( )" for the data type "TIFF color data (Dot sequential)" as a decode function F for generating printing data (step S522) (see also FIG. 5).

Further, if the data type is not "full color" ("No" in step S519), the decode processing determination section 31 selects a "decodeFunc015( )" for the data type "TIFF monochrome color data" as a decode function F for generating printing data (step S523) (see also FIG. 5).

As described above, the decode processing determination section 31 switches an appropriate decode functions F for generating printing data based on the data type of the PDL data D1.

<Decode Processing: Tiff Color Data (Dot Sequential System)>

Figure 10:
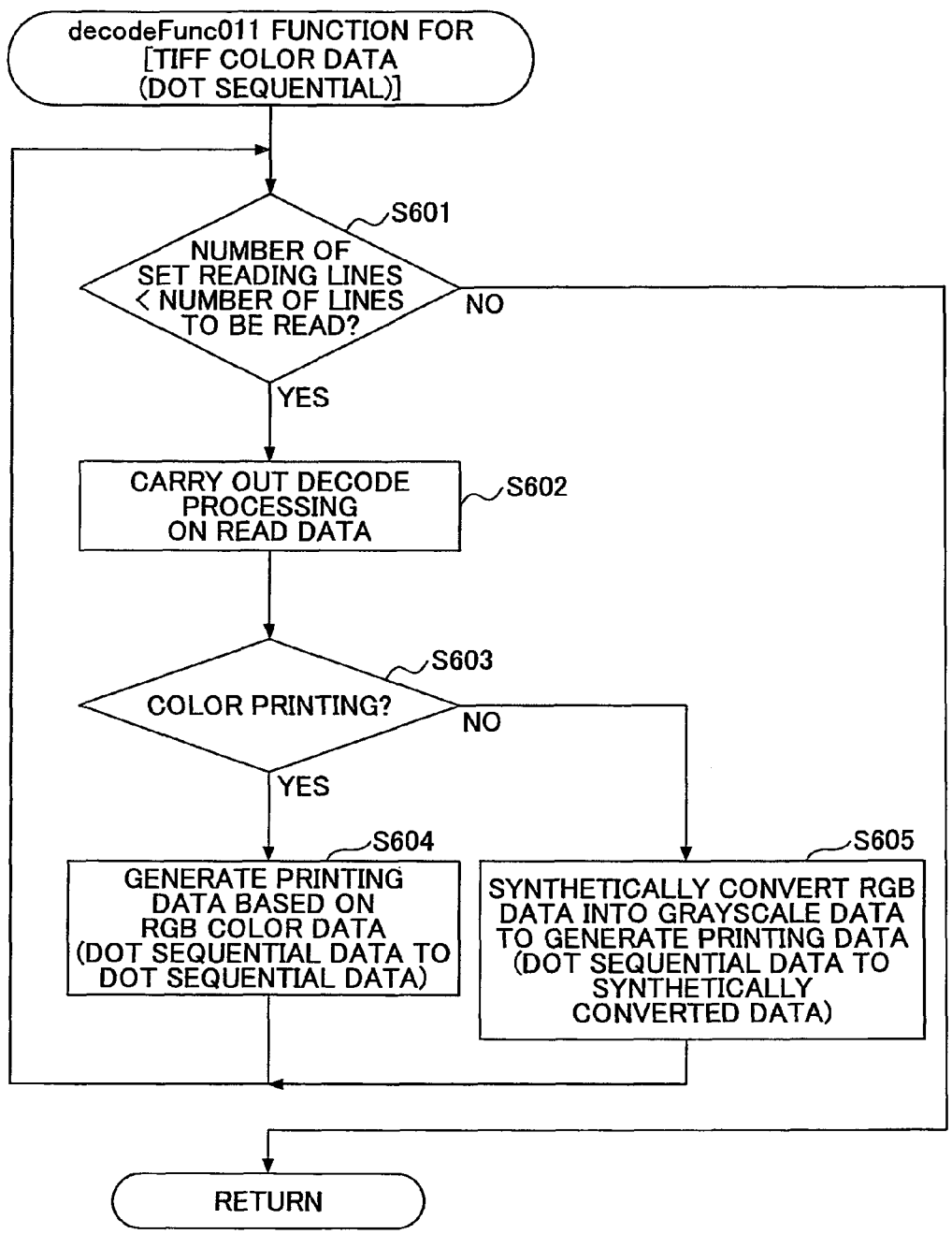
FIG. 10 is a flowchart illustrating a TIFF color data (dot sequential system) decode processing example in the image forming apparatus according to the first embodiment.
Figure 11A:
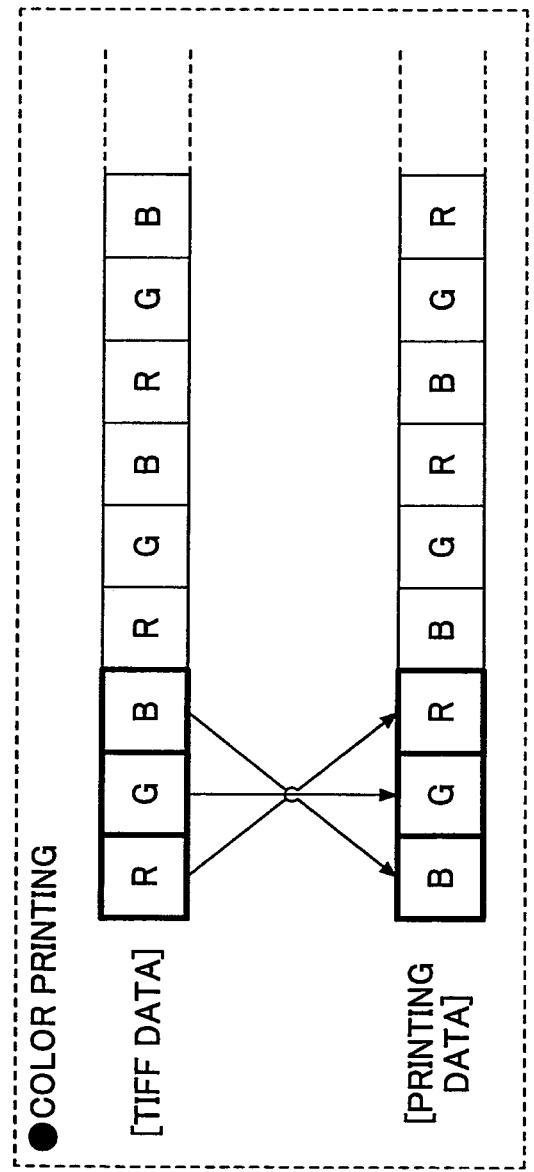
FIGS. 11A and 11B are operation examples illustrating a conversion process where TIFF color data (in the dot sequential system) are converted into printing data (i.e., TIFF color data in the dot sequential system are converted into unified data in the dot sequential system) in the image forming apparatus according to the first embodiment.
Figure 11B:
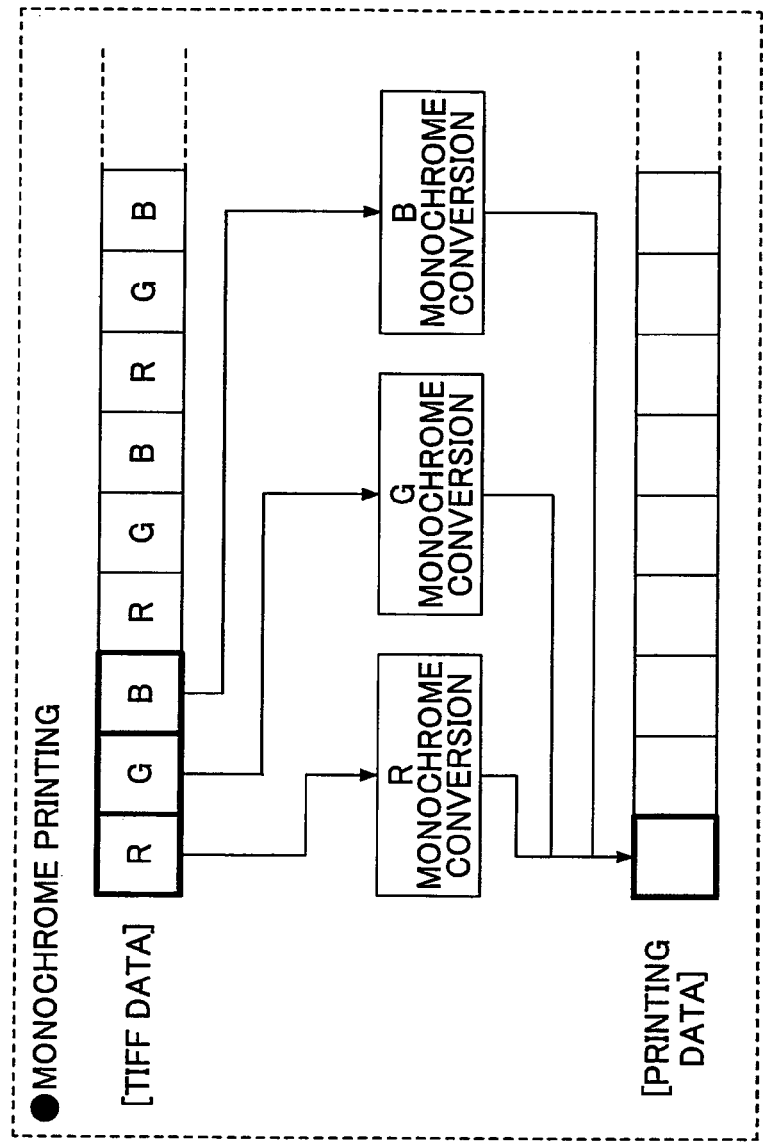

FIG. 10 is a flowchart illustrating a TIFF color data (dot sequential system) decoding processing example in the image forming apparatus according to the embodiment. FIGS. 11A and 11B are operation examples illustrating a conversion process where TIFF color data (in the dot sequential system) are converted into printing data (i.e., TIFF color data in the dot sequential system are converted into unified data in the dot sequential system) in the image forming apparatus according to the embodiment. FIGS. 10 and 11 depict detailed processing of generating the printing data D2 based on a function "decodeFunc011( )" selected in step S522.

As illustrated in FIG. 10, the function "decodeFunc011( )" determines whether the number of set reading lines is greater than the number of lines to be read (step S601).

If the number of lines to be read is greater than the number of set reading lines ("Yes" in step S601), the function "decodeFunc011" reads the data to carry out decode processing (step S302). In the decode processing carried out in this step, the read data are decoded based on the compression type of the PDL data information.

Subsequently, the function "decodeFunc011" determines whether the "color printing" is set for the color/monochrome printing setting based on the initial variable of the color/monochrome printing setting set in the initialization processing (step S603).

If the color/monochrome printing setting is "color printing" ("Yes" in step S603), the function "decodeFunc011" generates dot sequential printing data D2 based on the dot sequential RGB color data (step S604). More specifically, the function "decodeFunc011" generates dot sequential printing data D2 based on the dot sequential RGB color data as illustrated in FIG. 11A. FIG. 11A depicts a process where an RGB sequence in a pixel of the TIFF color data (dot sequential data) is converted into a BGR sequence in the pixel of dot sequential data to generate the converted dot sequential data as printing data D2. Note that in this example, dot sequential data having rearranged color signals are generated based on the dot sequential data having color signals arranged in an original sequence of an RGB sequence (i.e., the RGB sequence in a pixel is rearranged into the BGR sequence). The color signals are rearranged (from the RGB sequence to the BGR sequence) because the subsequent image adjustment-conversion processing and rendering processing require the dot sequential data having color signals in the BGR sequence. Thus, if color signals are to be processed in the RGB sequence in the subsequent processing, the step S604 may be omitted.

If, on the other hand, the color/monochrome printing setting is not "color printing" ("No" in step S603), the function "decodeFunc011" synthetically converts the dot sequential RGB color data into grayscale data to generate dot sequential printing data D2 (step S605). More specifically, the function "decodeFunc011" synthetically converts the dot sequential RGB color data into grayscale data to generate dot sequential printing data D2 as illustrated in FIG. 11B. FIG. 11B depicts a process where RGB color signals arranged in an RGB sequence in a pixel of the TIFF color data (dot sequential data) are converted into corresponding monochrome signals, and the converted monochrome signals are synthesized (integrated) in a pixel in the converted dot sequential data to generate the converted dot sequential data as printing data D2.

<Decode Processing: Tiff Color Data (Frame Sequential System)>

Figure 12:
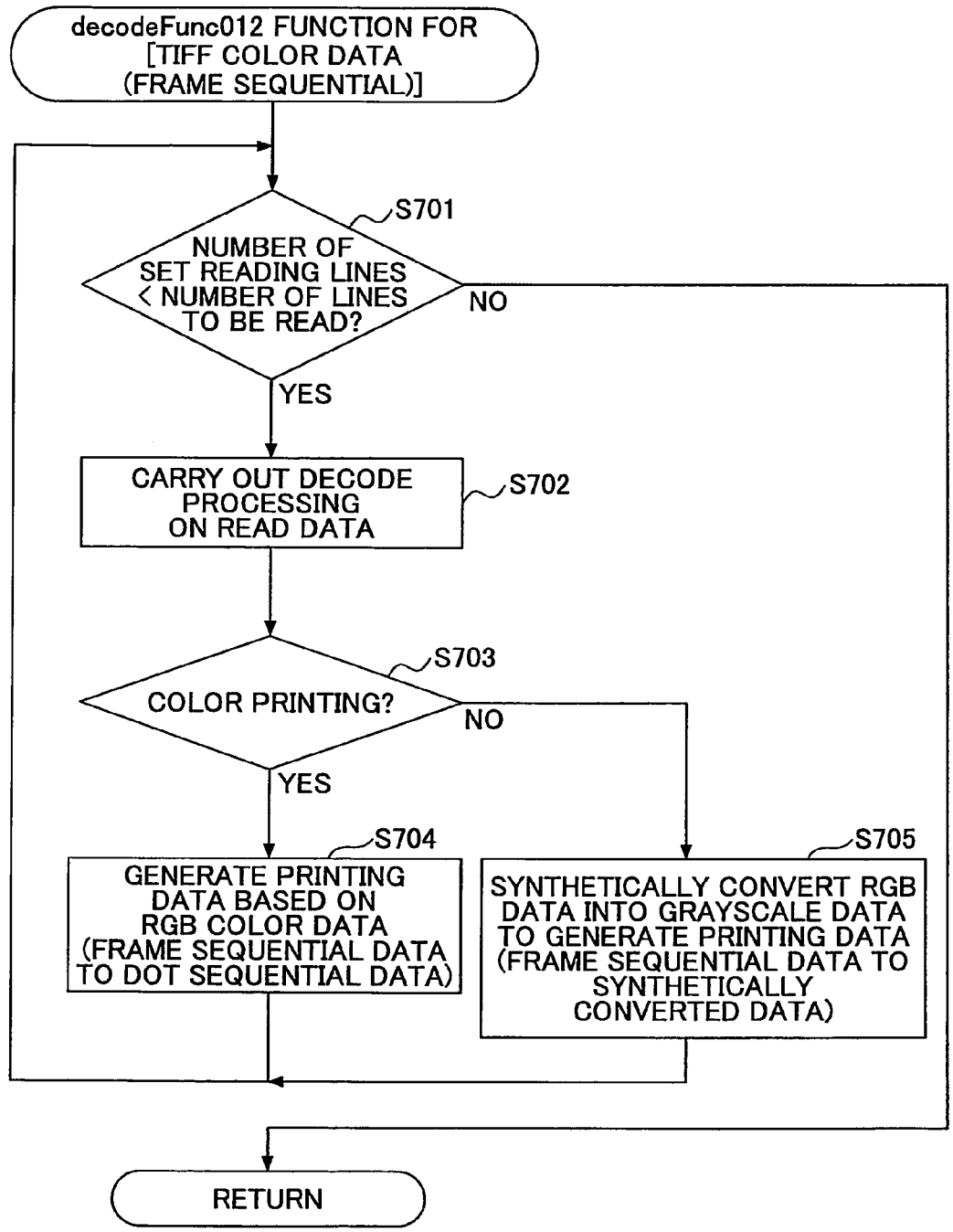
FIG. 12 is a flowchart illustrating a TIFF color data (frame sequential system) decode processing example in the image forming apparatus according to the first embodiment.

FIG. 12 is a flowchart illustrating a TIFF color data (frame sequential system) decoding processing example in the image forming apparatus according to the embodiment. FIGS. 13A and 13B are operation examples illustrating a conversion process where TIFF color data (in the frame sequential system) are converted into printing data (i.e., TIFF color data in the frame sequential system are converted into unified data in the dot sequential system) in the image forming apparatus according to the embodiment. FIGS. 12, 13A and 13B depict detailed processing of generating the printing data D2 based on a function "decodeFunc012( )" selected in step S521.

Steps S701 through S703 in FIG. 12 are the same as steps S601 through S603 illustrated in FIG. 11. Thus, Steps S704 and S705 in FIG. 12 differing from corresponding steps in FIG. 11 are described below.

If the color/monochrome printing setting is "color printing" ("Yes" in step S703), the function "decodeFunc012" generates dot sequential printing data D2 based on the frame sequential RGB color data (step S704). More specifically, the function "decodeFunc012" generates dot sequential printing data D2 based on the frame sequential RGB color data as illustrated in FIGS. 13A and 13B. FIG. 13A a process where R, G, and B color signals of TIFF color data (frame sequential data) are converted into color signals arranged in a BGR sequence in a pixel in dot sequential data (i.e., frame to dot conversion) to generate printing data D2. If, on the other hand, the color/monochrome printing setting is not "color printing" ("No" in step S703), the function "decodeFunc012" synthetically converts the frame sequential RGB color data into grayscale data to generate dot sequential printing data D2 (step S705). More specifically, the function "decodeFunc012" synthetically converts the frame sequential RGB color data into grayscale data to generate dot sequential printing data D2 as illustrated in FIG. 13B. FIG. 13B depicts a process where RGB color signals in the TIFF color data (frame sequential data) are converted into corresponding monochrome signals, and the converted monochrome signals are synthesized (integrated) in a pixel of the converted dot sequential data to generate printing data D2.

Thus, in the decode processing determined by the decode processing determination section 31, printing data D2 dot sequentially unified based on various dot sequential or frame sequential PDL data D1.

<Overview>

In the image forming apparatus 100 according to the embodiment, in the process prior to a process where the image adjustment-conversion processing is carried out, the decoding-rendering section 214 converts various PDL data into unified data in the dot sequential system to generate the dot sequentially unified printing data D2 and transfers the generated printing data D2 to the process where the image adjustment-conversion processing is carried out. Note that in the decoding-rendering section 214, the decode processing determination section 31 and the print data generator section 32 carry out the following generating processing. The decode processing determination section 31 determines the decode processing to be executed on PDL data D1 to generate printing data based on the various PDL data information items (e.g., data format and data type). Subsequently, the print data generator section 32 generates dot sequential printing data D2 based on the PDL data D1 utilizing the determined decode processing. Thus, in the image forming apparatus 100 according to the embodiment, since the data transmitted in the frame sequential system are unified into the data in the dot sequential system, the image adjustment-conversion processing may be carried out by the existing functions.

Accordingly, the image forming apparatus 100 according to according to the embodiment may be capable of carrying out image forming operations on color data transmitted in the frame sequential system by utilizing the existing image adjustment-conversion function that processes the dot sequential data. That is, the monochrome image adjustment-conversion function may be used as a shared function of the color/monochrome image adjustment-conversion function. With this configuration, since the existing function for monochrome data is utilized for color data, the processing performance achieved by the existing function may be maintained to secure the image quality. Further, in the image forming apparatus 100 according to the embodiment, color data having anew format and a new data type (feature) may be easily processed without altering other functions by simply registering the decode functions F for generating printing data in the print data generator section 32.

So far, the embodiment of the image forming apparatus 100 is described. Note that the "image forming function" of the image forming apparatus 100 according to the embodiment may implement the above-described various processings illustrated with reference to corresponding drawings by causing the CPU 111 of the image forming apparatus 100 to execute computer programs coded in a program language adapted to an operating environment (platform) of the image forming apparatus 100.

Such computer programs may be stored in the computer-readable recording medium 114a. Examples of the recording medium 114a include an SD memory card and a universal serial bus (USB) memory.

The computer programs may be stored in the recording medium 114a, retrieved from the recording medium 114a, and installed in the image forming apparatus 100 via the external storage IF 114 capable of reading the recording medium 114a. Further, since the image forming apparatus 100 includes the network IF 113, the above computer programs may be downloaded via a telecommunications line and installed in the image forming apparatus 100.

In one embodiment, there is provided an image forming apparatus for color printing that includes a generator unit configured to generate dot sequential data as printing data based on received PDL color data; an image adjustment-conversion unit configured to carry out image adjustment processing and/or image conversion processing on the printing data generated by the generator unit based on a set printing condition; a rendering unit configured to render the printing data held in a page memory on which the image adjustment processing and/or the image conversion processing has been carried out by the image adjustment-conversion unit; and a printing unit configured to print the printing data rendered by the rendering unit.

With this configuration, the image forming apparatus is capable of converting various PDL data into unified data in the dot sequential system to generate the dot sequentially unified printing data, and transferring the generated printing data to the process where the image adjustment-conversion processing is carried out prior to the process where the image adjustment-conversion processing is carried out. Note that the image forming apparatus according to the embodiment carried out the following generating processing. The image forming apparatus determines decode processing for generating the printing data based on the various PDL data information (e.g., data format and data type). Subsequently, the image forming apparatus generates dot sequential printing data based on the PDL data utilizing the determined decode processing. Thus, in the image forming apparatus according to the embodiment, since the data transmitted in the frame sequential system are unified into the data in the dot sequential system, the image adjustment-conversion processing may be carried out by the existing functions.

Accordingly, the image forming apparatus 100 according to the embodiment may be capable of carrying out image forming operation on color data transmitted in the frame sequential system, utilizing the existing image adjustment-conversion function that processes the dot sequential data. That is, the monochrome image adjustment-conversion function may be used as a shared function of the color/monochrome image adjustment-conversion function. Further, since the existing function for monochrome data is utilized for color data without alteration, the processing performance achieved by the existing function may be improved to secure the image quality.

In another embodiment, there is provided a method for forming an image in an image forming apparatus for color printing. The method includes generating dot sequential data as printing data based on received PDL color data; carrying out image adjustment processing and/or image conversion processing on the printing data generated in the generating step based on a set printing condition; rendering the printing data held in a page memory on which the image adjustment processing and/or the image conversion processing has been carried out in carrying out the image adjustment-conversion step; and printing the rendered printing data rendered in the rendering step.

In another embodiment, there is provided a computer program product embedded in an image forming apparatus for color printing. The computer program product includes a set of instructions, which, when executed by a processor, implement a method for forming an image. The method includes generating dot sequential data as printing data based on received PDL color data; carrying out image adjustment processing and/or image conversion processing on the printing data generated in the generating step based on a set printing condition; rendering the printing data held in a page memory on which the image adjustment processing and/or the image conversion processing, has been carried out in carrying out the image adjustment-conversion step; and printing the printing data rendered in the rendering step.

With such steps, the method is capable of converting various PDL data into unified data in the dot sequential system to generate the dot sequentially unified printing data, and transferring the generated printing data to the process where the image adjustment-conversion processing is carried out prior to the process where the image adjustment-conversion processing is carried out.

Accordingly, the method according to the embodiment may be capable of carrying out image forming operation on color data transmitted in the frame sequential system, utilizing the existing image adjustment-conversion function that processes the dot sequential data.

The embodiment may provide the apparatus, the method, and the computer program product capable of forming images utilizing the existing monochrome image adjustment-conversion function that is made compatible with color data and used as a shared function of the color/monochrome image adjustment-conversion function.

Embodiments of the present invention have been described for the purpose of illustration. The present invention is not limited to these embodiments, but various variations and modifications may be made without departing from the scope of the present invention. The present invention should not be interpreted as being limited to the embodiments that are described in the specification and illustrated in the drawings.

The present application is based on Japanese Priority Application No. 2010-040841 filed on Feb. 25, 2010, with the Japanese Patent Office, the entire contents of which are hereby incorporated by reference.

What is claimed is:

1. An image forming apparatus for color printing comprising:
   a generator unit configured to generate dot sequential data as printing data based on received PDL color data;
   an image adjustment-conversion unit configured to carry out image adjustment processing on the printing data generated by the generator unit based on a set printing condition, the image adjustment processing including at least one of brightness adjustment, contrast adjustment, pixel inversion, enlargement and reduction processing;
   a rendering unit configured to render the printing data held in a page memory on which the image adjustment processing has been carried out by the image adjustment-conversion unit,
   the rendering unit further including:
      an apparatus model information acquisition library,
      a rendering library,
      a graphics engine, and
      a color matching module; and
   a printing unit configured to print the printing data rendered by the rendering unit.

2. The image forming apparatus as claimed in claim 1, further comprising:
   an analyzing unit configured to analyze the PDL color data; and
   a determination unit configured to determine a decode processing to be carried out on the PDL color data so as to generate the printing data based on PDL data type information of the PDL color data acquired by the analyzing unit,
   wherein the generator unit generates, after carrying out the decode processing determined by the determination unit on the PDL color data, dot sequential printing data based on the decoded PDL color data.

3. The image forming apparatus as claimed in claim 2, wherein the generator unit includes a plurality of decode functions corresponding to printable PDL data to generate the dot sequential printing data based on the decoded PDL color data after carrying out the decode processing determined by the determination unit on the PDL color data, and
   wherein the determination unit determines the decode processing to be carried out on the PDL color data so as to generate the printing data by selecting a desired one of the decode functions based on a data format and a data type contained in the PDL data type information of the PDL color data.

4. The image forming apparatus as claimed in claim 2, wherein:
   the generator unit converts, in a case where the PDL color data are frame sequential data, the frame sequential PDL color data to dot sequential PDL color data, and generates, after carrying out the decode processing determined by the determination unit on the dot sequential PDL color data, the dot sequential printing data based on the decoded dot sequential PDL color data.

5. The image forming apparatus as claimed in claim 1, wherein the rendering unit is configured to create a rendering frame.

6. The image forming apparatus as claimed in claim 1, wherein the image adjustment-conversion unit is configured to carry out image adjustment processing on both monochrome image data and color data transmitted in the frame sequential system.

7. A method for forming an image in an image forming apparatus for color printing, the method comprising:
   generating dot sequential data as printing data based on received PDL color data;
   carrying out image adjustment processing on the printing data generated in the generating step based on a set printing condition, the image adjustment processing including at least one of brightness adjustment, contrast adjustment, pixel inversion, enlargement and reduction processing;
   rendering the printing data held in a page memory on which the image adjustment processing has been carried out in carrying out the image adjustment-conversion step using a rendering unit including an apparatus model information acquisition library, a rendering library, a graphics engine, and a color matching module; and
   printing the printing data rendered in the rendering step.

8. A computer program product loaded in an image forming apparatus for color printing, the computer program product having a set of instructions, which, when executed by a processor, implements a method for forming an image, the method comprising:
   generating dot sequential data as printing data based on received PDL color data;
   carrying out image adjustment processing on the printing data generated in the generating step based on a set printing condition, the image adjustment processing including at least one of brightness adjustment, contrast adjustment, pixel inversion, enlargement and reduction processing;
   rendering the printing data held in a page memory on which the image adjustment processing has been carried out in carrying out the image adjustment-conversion step using a rendering unit including an apparatus model information acquisition library, a rendering library, a graphics engine, and a color matching module; and
   printing the printing data rendered in the rendering step.

* * * * *